(12) United States Patent
Krzywon

(10) Patent No.: US 11,866,151 B2
(45) Date of Patent: *Jan. 9, 2024

(54) SYSTEM AND METHOD FOR DETECTING PROPELLER MALFUNCTION

(71) Applicant: PRATT & WHITNEY CANADA CORP., Longueuil (CA)

(72) Inventor: Jagoda Krzywon, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 410 days.

This patent is subject to a terminal disclaimer.

(21) Appl. No.: 17/132,220

(22) Filed: Dec. 23, 2020

(65) Prior Publication Data
US 2022/0194555 A1 Jun. 23, 2022

(51) Int. Cl.
*B64C 11/30* (2006.01)

(52) U.S. Cl.
CPC ............ *B64C 11/301* (2013.01); *B64C 11/30* (2013.01)

(58) Field of Classification Search
CPC ....... B64C 11/30; B64C 11/301; B64C 11/38; B64C 11/385; B64C 11/44
See application file for complete search history.

(56) References Cited

U.S. PATENT DOCUMENTS

| 2,934,154 | A | * | 4/1960 | Chilman | B64C 11/385 416/61 |
| 3,115,937 | A | * | 12/1963 | Biermann | B64C 11/385 416/46 |
| 6,077,040 | A | * | 6/2000 | Pruden | B64C 11/38 416/157 R |
| 8,186,951 | B2 | * | 5/2012 | Carvalho | B64C 11/30 416/61 |
| 2016/0333730 | A1 | * | 11/2016 | Duke | B64F 5/60 |
| 2018/0237125 | A1 | * | 8/2018 | Lisio | B64C 11/30 |
| 2020/0049027 | A1 |  | 2/2020 | Duke et al. |  |
| 2021/0009252 | A1 | * | 1/2021 | Forte | B64C 11/305 |

FOREIGN PATENT DOCUMENTS

| CN | 111936384 | 11/2020 |
| GB | 1309690 | 3/1973 |

* cited by examiner

*Primary Examiner* — Justin D Seabe
(74) *Attorney, Agent, or Firm* — NORTON ROSE FULBRIGHT CANADA LLP

(57) ABSTRACT

A system and method for detecting fixed pitch operation of a variable pitch propeller of an engine are provided. A command signal for maintaining a rotational speed of the propeller at a reference speed is output. An actual value of at least one of the rotational speed and a blade angle of the propeller is obtained. From the actual value, it is assessed whether an expected change in the at least one of the rotational speed and the blade angle of the propeller has occurred in response to the command signal. Responsive to determining that the expected change in the at least one of the rotational speed and the blade angle of the propeller has not occurred in response to the command signal, operation of the propeller at fixed pitch is detected and an alert output accordingly.

18 Claims, 6 Drawing Sheets

SYSTEM AND METHOD FOR DETECTING PROPELLER MALFUNCTION

TECHNICAL FIELD

The application relates generally to engines, and, more particularly, to detecting a malfunction of a propeller coupled to an engine.

BACKGROUND OF THE ART

Constant speed propellers are controlled by varying blade angles to maintain the speed of the propeller at a reference speed. In order to do so, the propeller blade angle is increased with increasing engine power and speed and decreased with decreasing engine power and speed. Varying the blade angle is achieved by either adding or removing oil in the propeller dome.

A malfunction of the propeller, and particularly operation of the propeller at fixed pitch, would prevent the propeller speed for being appropriately controlled, which would in turn create a risk to aircraft safety. There is therefore a need for systems and methods for detecting fixed pitch operation of a variable pitch propeller.

SUMMARY

In one aspect, there is provided a method for detecting fixed pitch operation of a variable pitch propeller of an engine. The method comprises outputting a command signal for maintaining a rotational speed of the propeller at a reference speed, obtaining an actual value of at least one of the rotational speed and a blade angle of the propeller, assessing, from the actual value, whether an expected change in the at least one of the rotational speed and the blade angle of the propeller has occurred in response to the command signal, and responsive to determining that the expected change in the at least one of the rotational speed and the blade angle of the propeller has not occurred in response to the command signal, detecting operation of the propeller at fixed pitch and outputting an alert accordingly.

In another aspect, there is provided a system for detecting fixed pitch operation of a variable pitch propeller of an engine. The system comprises a processing unit and a non-transitory computer readable medium having stored thereon program code executable by the processing unit for outputting a command signal for maintaining a rotational speed of the propeller at a reference speed, obtaining an actual value of at least one of the rotational speed and a blade angle of the propeller, assessing, from the actual value, whether an expected change in the at least one of the rotational speed and the blade angle of the propeller has occurred in response to the command signal, and responsive to determining that the expected change in the at least one of the rotational speed and the blade angle of the propeller has not occurred in response to the command signal, detecting operation of the propeller at fixed pitch and outputting an alert accordingly.

In a further aspect, there is provided a non-transitory computer-readable medium having stored thereon program instructions executable by a processor for detecting fixed pitch operation of a variable pitch propeller of an engine. The program instructions are configured for outputting a command signal for maintaining a rotational speed of the propeller at a reference speed, obtaining an actual value of at least one of the rotational speed and a blade angle of the propeller, assessing, from the actual value, whether an expected change in the at least one of the rotational speed and the blade angle of the propeller has occurred in response to the command signal, and responsive to determining that the expected change in the at least one of the rotational speed and the blade angle of the propeller has not occurred in response to the command signal, detecting operation of the propeller at fixed pitch and outputting an alert accordingly.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
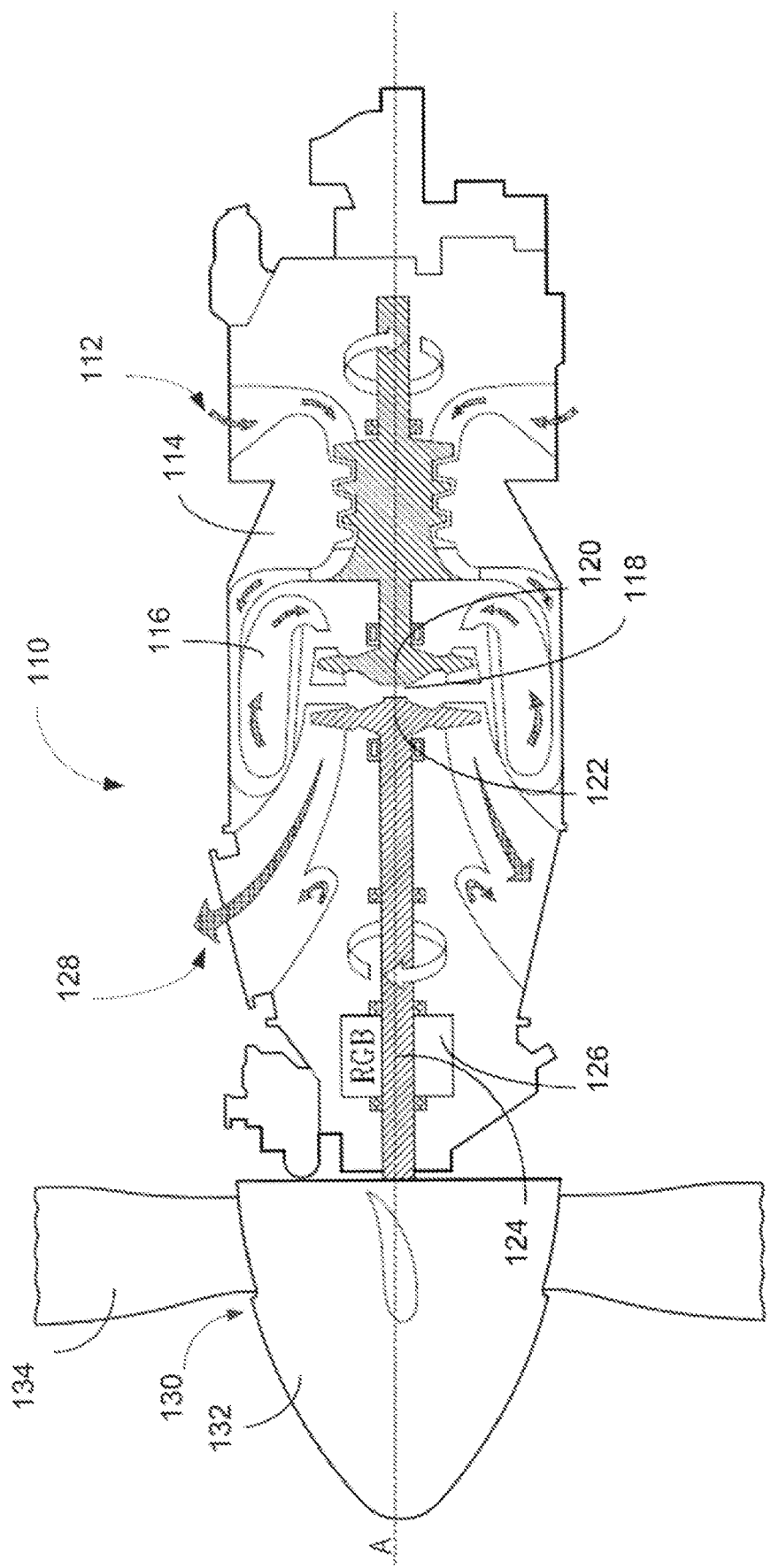
FIG. 1 is a schematic cross-sectional view of an engine, in accordance with an illustrative embodiment.

There is described herein systems and methods for detecting malfunction of a propeller for an aircraft, and more specifically for detecting fixed pitch operation of a variable pitch propeller. The aircraft is equipped with at least one engine, such as the exemplary engine 110 depicted in FIG. 1. In one embodiment, the engine 110 is a gas turbine engine of a type typically provided for use in subsonic flight. In this embodiment, the engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and is coupled with a reduction gearbox (RGB) 126. The power turbine 122 rotatingly drives a rotor shaft (also referred to herein as a propeller shaft or an output shaft) 124 about a propeller shaft axis 'A' through the RGB 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades 134 connected to the hub 132 by any suitable means and extending radially therefrom. The blades 134 are also each rotatable about their own radial axes through a plurality of blade angles, which can be changed to achieve modes of operation, such as feather, full reverse, and forward thrust.

The propeller 130 converts rotary motion from the engine 110 to provide propulsive force to the aircraft (also referred to herein as thrust). In one embodiment, propeller 130 is a constant speed variable pitch propeller, meaning that the propeller 130 is designed to have its blade angle (also referred to as the "pitch angle" or "pitch") automatically changed to allow it to maintain a constant rotational speed (also referred to herein as a "reference speed"), regardless of the amount of engine torque being produced, the speed of the aircraft, or the altitude at which the aircraft is flying. As used herein, the term propeller blade angle refers to the angle between the propeller blade and the rotational plane of the propeller 130. Other configurations for a turboprop engine may also apply.

Although the examples illustrated herein show a turboprop engine, it will be understood that the methods and systems described herein may be applied to other propeller-based engines, such as piston engines, electrical engines, and the like. It should also be understood that the engine 110 may be any suitable aircraft propulsion system, and may include in some embodiments an all-electric propulsion system or a hybrid-electric propulsion system having a propeller driven in a hybrid architecture (series, parallel, or series/parallel) or turboelectric architecture (turboelectric or partial turboelectric). In addition, it will be understood that the engine 110 may be found in aircraft as well as in other industrial applications, including, but not limited to, wind power turbines and ship propulsion and electric power generators.

Figure 2:
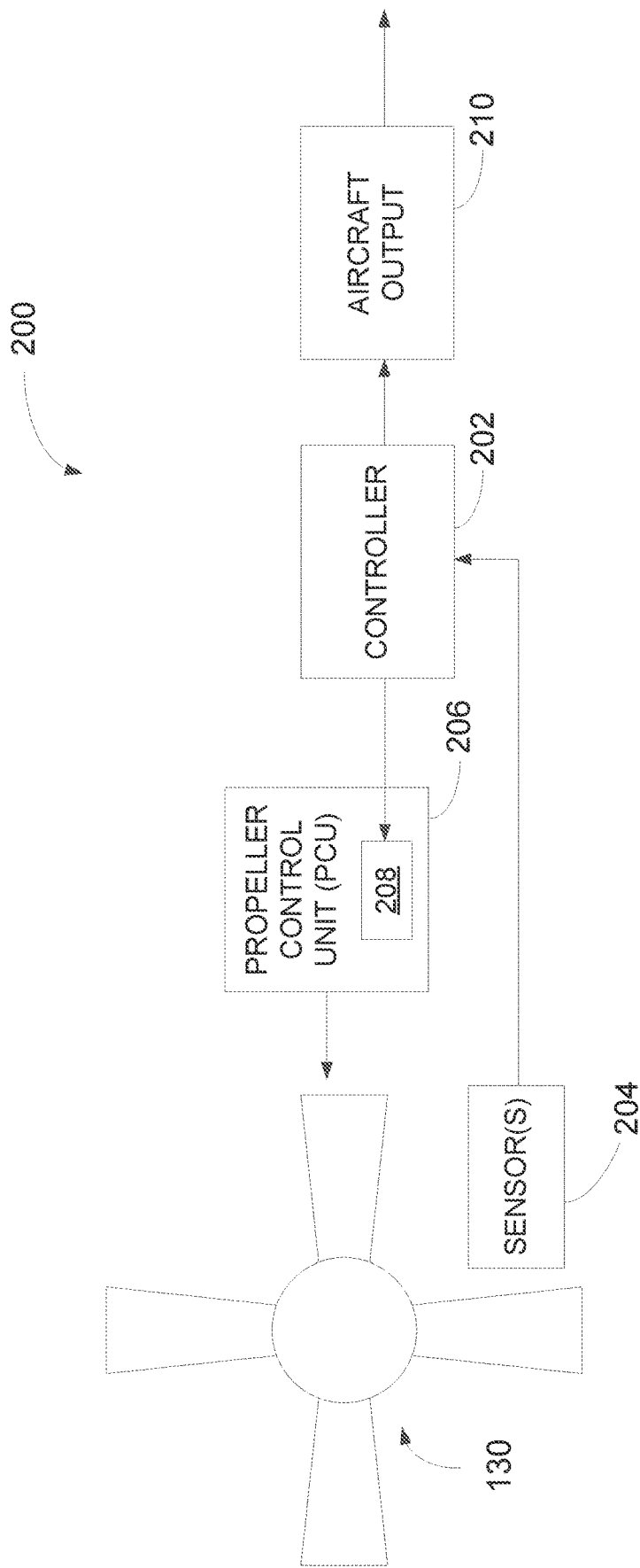
FIG. 2 is a schematic diagram of an example embodiment of a propeller control assembly for the engine of FIG. 1, in accordance with an illustrative embodiment.

Referring to FIG. 2 in addition to FIG. 1, there is illustrated an example embodiment of a propeller control assembly 200. A controller 202 receives, from one or more sensors 204 coupled to the engine 110 and/or propeller 130, one or more input signals. The input signal(s) comprise measurements of one or more parameters for use in controlling the engine 110 and/or propeller 130. As will be discussed further below, based on the received input signal(s), the controller 202 regulates, via a Propeller Control Unit (PCU) 206, the flow of fluid (e.g., oil) to the propeller 130 in accordance with a reference rotational speed to which the propeller 130 is to be set (or equivalently in accordance with a pre-determined propeller blade angle threshold). In other words, the flow of fluid is regulated to maintain the propeller 130 at the reference speed (or to prevent the propeller 130 from operating at a blade angle exceeding the blade angle threshold). The reference speed (and/or blade angle threshold) is pre-determined and may be obtained by any suitable means, e.g. retrieved from a database, a memory, or other storage medium to which the controller 202 may be communicatively coupled. The value of the reference speed (and/or blade angle threshold) may depend on engine configuration and is illustratively set to protect the engine 110 from overspeeding.

The sensor(s) 204 may comprise one or more speed sensors configured to acquire measurement(s) of the actual (or current) rotational speed (Np) of the propeller 130. The sensor(s) 204 may also comprise one or more accelerometers configured to acquire measurement(s) of the actual (or current) acceleration of the propeller 130. The speed and/or acceleration measurement(s) acquired by the sensor(s) 204 are then provided to the controller 202. It should however be understood that, in some embodiments, rather than being directly received at the controller 202 from the sensor(s) 204, the propeller speed may be calculated based on one or more other engine and/or aircraft parameters measured using the sensor(s) 204.

The sensor(s) 204 are also configured to measure the actual blade angle of the propeller 130 and to provide this measurement to the controller 202. In one embodiment, the sensor(s) 204 comprise one or more sensors configured to magnetically measure the passing of position markers provided on a feedback device (also referred to as a "beta ring") operatively coupled to the propeller 130. Measurement of the markers' position in turn provides, based on the markers' physical geometry, an indication of the position of the feedback device and accordingly an indication of the propeller blade angle. It should be understood that, in some embodiments, a single sensor 204 may be used to obtain the propeller blade angle measurements and the propeller speed measurements. Indeed, the same sensor signal may be used to determine the propeller speed and the position of the feedback device, which in turn indicates the propeller blade angle.

When the propeller's actual speed deviates from the reference speed (as determined by the controller 202 based on the input signal(s) received from the sensor(s) 204), the controller 202 responds with a change in blade angle and commands the PCU 206 to direct fluid under pressure to the propeller 130 or to release (i.e. remove) fluid from the propeller 130. The change in fluid volume going to the propeller 130 causes a change in propeller blade angle, which in turn affects the rotational speed of the propeller 130. Indeed, as known to those skilled in the art, rotational speed of the propeller 130 is set via an angle of the blades 134. Fining the blade angle results in a propeller speed increase and coarsing the blade angle results in a propeller speed decrease.

More specifically, in one embodiment, the controller 202 transmits a signal or command (also referred to herein as a "PCU command") to the PCU 206, which in turn responds by regulating fluid flow to and from the propeller 130 accordingly. The PCU 206 illustratively regulates fluid flow to and from the propeller 130 via an actuator (also referred to as a "pitch angle actuator" or a "blade angle actuator") 208, which is controlled by the controller 202 via the PCU command. The fluid illustratively flows from a fluid source (e.g., a source of oil) provided on the aircraft (e.g. from the engine oil system or from an oil pump of the PCU 206). The actuator 208 can be actuated between a closed position and an open position to selectively allow or prevent fluid flow (i.e. supply or drain fluid) to and from the propeller 130. In one embodiment, the actuator 208 is an Electrohydraulic Servo Valve (EHSV) and the controller 202 is configured to output the PCU command that determines a governing current of the EHSV. The governing current determines the opening of the EHSV for controlling the flow of fluid from the fluid source to the propeller 130. In one embodiment, a positive governing current commands oil supply and a negative governing current commands oil drain. In some embodiments, the controller 202 may be configured to set minimum and maximum governing currents for the EHSV, as well as absolute rates of change of the governing current. While the actuator 208 is described herein with reference to an EHSV, it should however be understood that the PCU 206 may include any suitable component, and any suitable arrangement of components, for regulating fluid flow to and from the propeller 130.

Still referring to FIG. 2, the controller 202 is configured to detect a malfunction of the propeller 130 on the basis of the PCU command and of the input signal(s) received from the sensor(s) 204. In particular, the controller 202 is configured to detect that the propeller 130 is operating at a fixed pitch (instead of being free in movement) for maintaining the propeller at the reference speed, a condition referred to herein as the propeller being "jammed" in its axial movement. Such a propeller failure condition (resulting in the variable pitch propeller system operating at fixed pitch) can be a result of a failure of the overall propeller system, as well as a mechanical failure of the actuator 208 (i.e. seizure at one position), preventing the PCU command from attaining the requested propeller transition due to inability to modulate the mechanical system of the actuator 208. It is proposed herein to detect errors in reading the propeller speed and/or blade angle, as well as to detect errors in the PCU command (e.g., errors in terms of the commanded governing current and in terms of the feedback related to the actuator 208.

For this purpose, the controller 204 monitors the input signal(s) received from the sensor(s) 204 and assesses whether an expected response from the propeller 130 (in terms of blade angle and/or rotational speed) has occurred in response to the PCU command (e.g., in response to the change in EHSV current commanded by the controller 202). A lack of change in propeller blade angle and/or propeller rotational speed in response to the PCU command provides an indication of the propeller 130 being jammed.

In some embodiments, the propeller blade angle may be monitored (e.g., by the sensor(s) 204) over the full range of possible blade angles. If this is the case, the propeller jammed condition may be detected based on the propeller blade angle only, by assessing whether a change (i.e. increase or decrease) in propeller blade angle has occurred in response to the PCU command. In embodiments where the propeller blade angle can only be monitored in a specific range, the propeller jammed condition may be detected based on the propeller speed, by assessing whether an expected change (i.e. increase or decrease) in propeller speed has occurred in response to the PCU command. Alternatively, the propeller jammed condition may be detected based on both the propeller blade angle and the propeller speed, with the propeller blade angle being used when the propeller is operating within the specific blade angle range and the propeller speed being used when the propeller is operating outside of the specific blade angle range (i.e. when the blade angle cannot be monitored).

As will be discussed further below, upon detection of the propeller 130 being jammed, the controller 202 is configured to generate and output an alert, such as a warning indication or message, for annunciation in the aircraft cockpit in order to inform the crew of the propeller malfunction (i.e. of operation with the fixed-pitch propeller 130). The pilot and/or crew may in turn take over control of the aircraft and take appropriate action by applying a specific procedure that is required to protect the aircraft from unsafe flight conditions that can be induced with the propeller 130 being jammed. In particular, the crew may modulate the power of the engine 110 in a manner that will not expose the propeller 130 to the risk of overspeed. In addition, knowledge of the propeller 130 being jammed would make the crew aware of the risk arising from shutting down the engine 110, which would result in an inability to feather the propeller 130 following a complete loss of power of the engine 110. Moreover, the crew may optimize the availability of the engine power and propeller thrust and accommodation for operation with a fixed pitch propeller may be defined between the airframer, engine manufacturer, and propeller manufacturer.

Figure 3:
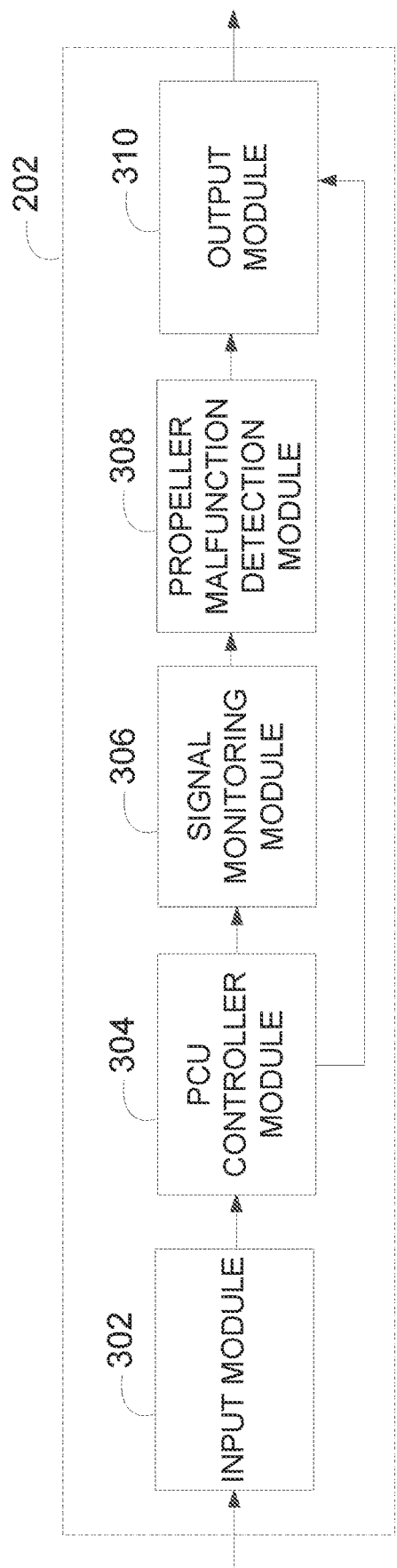
FIG. 3 is a block diagram of the controller of FIG. 2, in accordance with an illustrative embodiment.

Referring to FIG. 3, there is illustrated an example embodiment of the controller 202. The controller 202 may be an Engine & Propeller Electronic Control (EPEC) system, an engine controller, such as a Full Authority Digital Engine Control (FADEC), an Engine Electronic Control (EEC), an Engine Control Unit (ECU), or the like. In the embodiment illustrated in FIG. 3, the controller 202 comprises an input module 302, a PCU controller module 304, a signal monitoring module 306, a propeller malfunction detection module 308, and an output module 310.

As previously noted and as will be discussed further below, the controller 202 is configured to detect a condition of the propeller (reference 130 in FIG. 2) being jammed by monitoring the change in propeller speed and/or propeller blade angle in relation to the change in the PCU command. For this purpose, the input module 302 receives one or more input signals comprising an actual value of the propeller speed and/or propeller blade angle as obtained from measurements acquired by the sensor(s) (reference 204 in FIG. 2) coupled to the propeller 130. These input signal(s) are then provided to the PCU controller module 304 for processing.

The PCU controller module 304 is further configured to generate and output the PCU command that would allow to achieve an expected propeller position or speed, based on the sensor signal(s) received from the input module 302. In particular, the PCU controller module 304 estimates the PCU actuator command (e.g., the EHSV governing current) that is required to position the propeller blades (reference 134 in FIG. 1) at a different angle in order to maintain the propeller 130 at the reference speed (or equivalently the command required to prevent the propeller 130 from exceeding specific thresholds of the propeller blade angle). The PCU controller module 304 may then send the PCU command in the output module 310 for transmission to the PCU actuator command (reference 206 in FIG. 2), for use in adjusting the propeller speed and/or angle.

The sensor signal(s) and the PCU command may further be provided to the signal monitoring module 306, which is configured to confirm that the received signals are healthy. In particular, the signal monitoring module 306 is configured to assess whether the sensor signal(s) are within range and failure free. This may be achieved by the signal monitoring module 306 verifying the speed and/or blade angle reading from multiple sources. For example, the propeller system may comprise a dual channel electronic control system, comprised of control system configured to implement a control system for the propeller and a protection system configured to implement a protection function for the propeller. In this case, the protection system would receive the propeller speed and blade angle reading from a dedicated sensor having dual measuring coils (one for each of two protection channels) and the control system would receive the propeller speed and blade angle reading from a dedicated sensor having dual measuring coils (one for each of two control channels). Redundancy in speed and blade angle reading by the two channels of the protection system and the two channels of the control system allows for accommodation to the value closer to the reading from the two channels of the protection system in the event of a mismatch between the propeller speed and/or blade angle reading from the two channels of the control system.

In one embodiment, reliance on the reading from the protection system as a back-up for propeller speed and/or blade angle could be enhanced by the control system monitoring the existence of a deviation in reading between both protection channels as well as by the control system monitoring for deviations between the reading of the propeller speed and/or blade angle of both protection channels and both control channels. As a result of this monitoring, appropriate fault accommodation or fault indication could be perform to allow for correction of any failure conditions as soon as possible after detection thereof.

The signal monitoring module 306 may consider a pre-determined range of the propeller speed and/or blade angle as the propeller's operating range. As such, any propeller speed and/or blade angle reading that is out of the expected operating range would be considered by the signal monitoring module 306 as a faulty reading.

In addition, the signal monitoring module 306 may also consider the rate of change of the propeller speed and/or blade angle in relation to predefined criteria (or thresholds) that may be mechanically achievable by the propeller system. In other words, any propeller speed and/or blade angle reading that is beyond the expected rate of range in propeller speed and/or blade angle would be considered by the signal monitoring module 306 as indicative of faulty readings.

The signal monitoring module 306 may also compare the propeller speed reading to an expected propeller speed, which may be estimated based on the measurement of the speed of the engine power turbine (reference 122 in FIG. 1), which, as described herein above, drives the propeller shaft (reference 124 in FIG. 1) through the RGB (reference 126 in FIG. 1) or based on other engine operating parameters. Any propeller speed reading that deviates from the estimated propeller speed would be considered by the signal monitoring module 306 as a faulty reading.

The signal monitoring module 306 may also detect a lost or corrupted propeller speed and/blade angle signal. In particular, a propeller speed and/or angle reading (i.e. signal) that is lost or deviates in a pre-defined manner (e.g., oscillating or intermittent) would be considered by the signal monitoring module 306 as a faulty reading.

The signal monitoring module 306 considers the propeller speed and/or blade angle reading as healthy if the readings are not detected to be faulty in any of the pre-defined fault detection conditions described herein above.

The signal monitoring module 306 is further configured to confirm that the PCU command (i.e. a current request to the actuator, reference 208 in FIG. 2) is healthy (i.e. failure-free). In one embodiment, the signal monitoring module 306 (or alternatively a separate PCU actuator controller) uses feedback from the actuator 208 to control the governing current, and for fault detection of the PCU 206 and/or of the actuator 208. The signal monitoring module 306 performs continuous monitoring of the propeller speed and/or blade angle as well as of the PCU command. The monitoring of the PCU command may be performed after the PCU command is provided from the PCU controller module 304, thus allowing for monitoring of the feedback in relation to the provided command. In particular, the signal monitoring module 306 may be configured to compare the commanded governing current (e.g. by monitoring of the feedback current from the actuator 208 and/or PCU 206) to the maximum governing current. If the commanded governing current exceeds the maximum governing current, overcurrent is detected and the signal monitoring module 306 determines that the PCU command is faulty.

The signal monitoring module 306 may be configured to detect a lost, erroneous or corrupted commanded governing current (e.g., lost feedback, intermittent feedback reading, or mismatch between command and feedback). A PCU Command and/or feedback that is lost or deviates in pre-defined manner (e.g. PCU feedback begins to be intermittent, or begins to deviate from the PCU command) would be considered by the signal monitoring module 306 (or alternatively a separate PCU actuator controller) as faulty.

The signal monitoring module 306 may also be configured to detect any shift from a so-called "zero current setting", which corresponds to a pre-determined value for the governing current that does not change the position of the actuator 208 (e.g., of the EHSV), and which is therefore expected to cause no change in the propeller speed or blade angle. The signal monitoring module 306, upon detecting a change in propeller speed and/or blade angle at the "zero current setting" would consider the PCU Command as faulty.

The signal monitoring module 306 would consider the PCU Command and PCU Feedback as healthy if no criteria are met for any of the pre-defined fault detection conditions described herein above.

In one embodiment, the controller 202 is a dual-channel controller. In this embodiment, when a faulty signal (i.e., a faulty sensor signal and/or a faulty PCU command) is detected using one channel (i.e. on an active channel) of the controller 202, the controller 202, and particularly the signal monitoring module 306 switches to the other channel (i.e. a standby channel) and obtains failure free sensor signal(s) and/or PCU command from this other channel. The signal monitoring module 306 then provides the failure-free sensor signals to the malfunction detection module 308 for use by the malfunction detection module 308 in detecting whether the propeller 130 is jammed.

Based on the failure-free signals it receives, the malfunction detection module 308 compares the actual value of the propeller speed and/or propeller blade angle to the actual value obtained in a previous clock cycle. If an expected change in the propeller speed and/or blade angle is not detected, the malfunction detection module 308 concludes to a malfunction of the propeller 130, i.e. that the propeller 130 is operating at fixed pitch.

In particular, when the propeller blade angle is used to detect propeller malfunction, if acceleration of the propeller 130 (i.e. an increase in the propeller speed) is to be achieved and an expected propeller transition towards lower blade angles (i.e. a decrease in the propeller blade angle) does not occur in response to the PCU command and the propeller blade angle remains unchanged, the malfunction detection module 308 detects that the propeller 130 is jammed. Conversely, when deceleration of the propeller 130 (i.e. a decrease in the propeller speed) is to be achieved, the malfunction detection module 308 detects that the propeller 130 is jammed when an expected propeller transition towards higher blade angles (i.e. an increase in the propeller blade angle) does not occur in response to the PCU command and the propeller blade angle remains unchanged. When the propeller speed is used to detect propeller malfunction, if the PCU command comprises instructions to increase the governing current of the actuator 208 in order to achieve an acceleration of the propeller 130, the malfunction detection module 308 detects that the propeller 130 is jammed when no expected change in the propeller speed with no added engine power is detected in response to the PCU command. Conversely, when the PCU command comprises instructions to decrease the governing current of the actuator 208 in order to achieve a deceleration of the propeller 130, the malfunction detection module 308 detects that the propeller 130 is jammed when no expected change in the propeller speed with no reduced engine power is detected in response to the PCU command.

In one embodiment, when the malfunction detection module 308 detects that there has been no reported change in propeller blade angle and/or propeller speed, the malfunction detection module 308 assesses whether the condition has been persisting for a period of time greater than a pre-determined duration, referred to herein as a pre-defined "latch time". The latch time may vary depending on engine configuration and may be obtained by any suitable means, e.g. retrieved from a database, a memory, or other storage medium to which the controller 202 may be communicatively coupled. If it is determined that the condition has persisted for a period of time that exceeds the latch time, the malfunction detection module 308 confirms that the propeller jammed condition is indeed present.

As discussed herein above, in one embodiment where the controller 202 is a dual-channel controller, the malfunction detection module 308 may be configured to confirm the detection criteria mentioned above on both controller channels. This may allow for improved robustness and for protection against incorrect or misleading detection of the propeller 130 being jammed. In other words, the malfunction detection module 308 may be configured to request confirmation of the propeller malfunction detection conditions on both the active channel and the standby channel.

Upon detection of the propeller 130 being jammed, the output module 310 generates a warning indication or message indicative of operation with propeller jammed and the warning indication is provided to an aircraft output (reference 210 in FIG. 2) for cockpit annunciation. Cockpit annunciation may be performed using any suitable means, such as by visual rendering of the warning indication on display(s) provided in the cockpit of the aircraft and/or audio output using any suitable audio output device provided in the aircraft. In one embodiment, the aircraft output 210 is an Aeronautical Radio Inc. (ARINC) output that uses the ARINC 429 data transfer standard for aircraft avionics to output the warning indication. Other data standards may also be used, such as ARINC 615, ARINC 717, and MIL-STD-1553.

Figure 4:
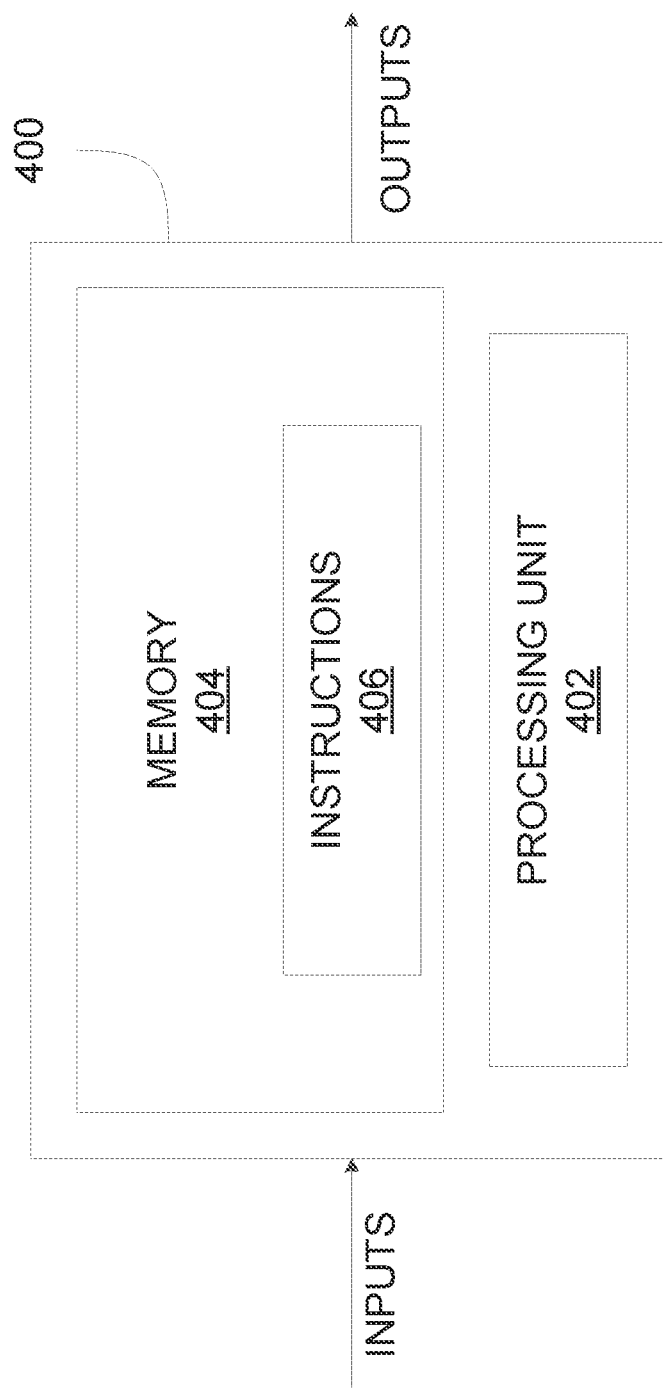
FIG. 4 is a block diagram of an example computing device for implementing the controller of FIG. 2, in accordance with an illustrative embodiment.

FIG. 4 is an example embodiment of a computing device 400 for implementing the controller 202 described above with reference to FIG. 2. The computing device 400 comprises a processing unit 402 and a memory 404 which has stored therein computer-executable instructions 406. The processing unit 402 may comprise any suitable devices configured to cause a series of steps to be performed such that instructions 406, when executed by the computing device 400 or other programmable apparatus, may cause the functions/acts/steps specified in the method described herein to be executed. The processing unit 402 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

Figure 5:
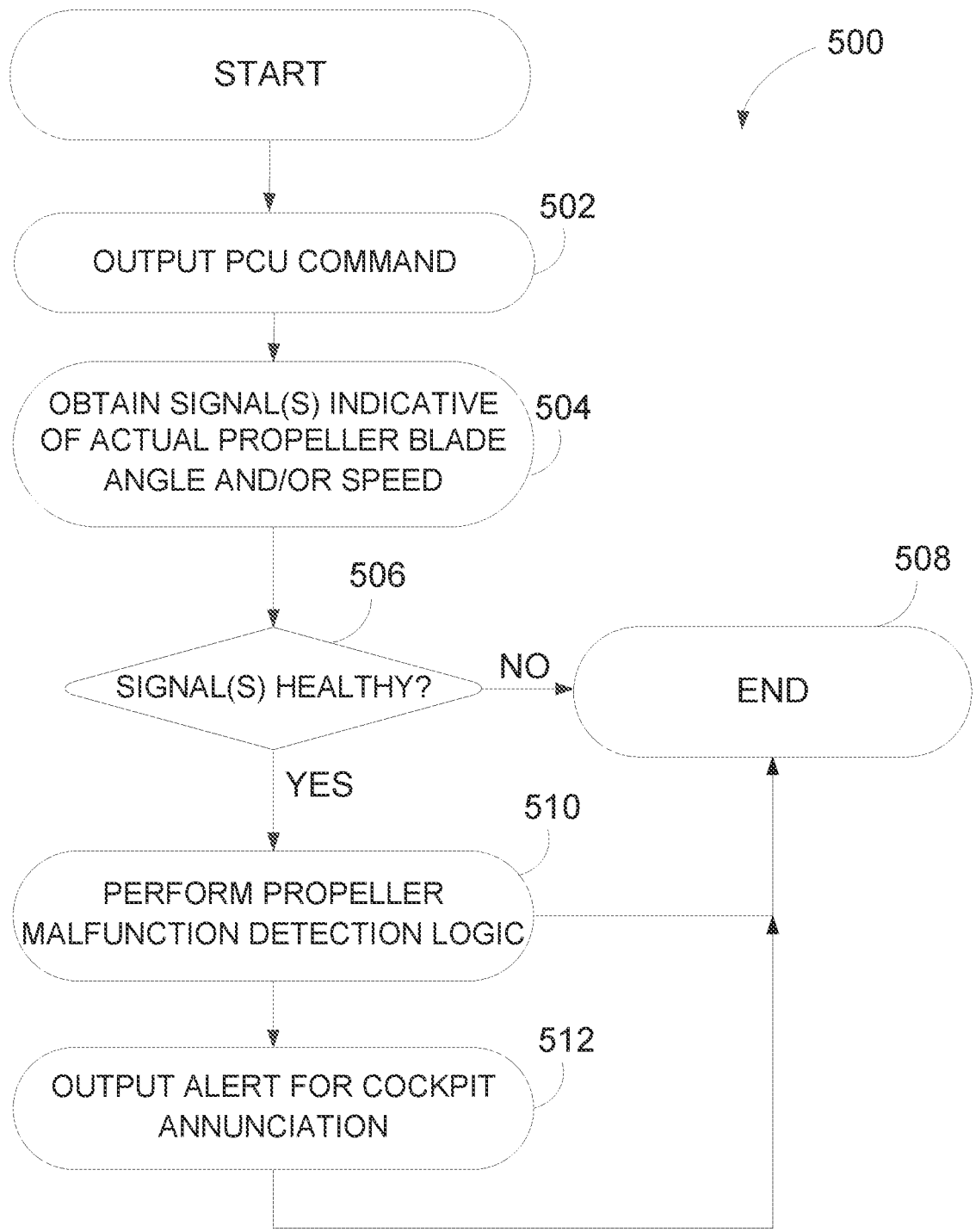
FIG. 5 is a flowchart of a method for detecting fixed pitch operation of a variable pitch propeller, in accordance with an illustrative embodiment.

Referring now to FIG. 5, a method 500 for detecting fixed pitch operation of a variable pitch propeller will now be described in accordance with one embodiment. The method 500 is illustratively performed by a controller (such as the controller 202 in FIG. 2). The method 500 comprises, at step 502, outputting a PCU command. As described above, in one embodiment, the controller 202 generates the PCU command required to vary the position of the propeller blades. in order to maintain the propeller at the reference speed and outputs the PCU command to the PCU (reference 206 in FIG. 2). In one embodiment, as discussed herein above, the controller calculates the oil flow required to obtain the desired propeller reference speed and generates the PCU command indicative of the governing current needed to achieve the required oil flow. The method 500 further comprises, at step 504, obtaining input signal(s) indicative of an actual value of the blade angle and/or the rotational speed of a propeller. The input signal(s) may be received from one or more sensor(s) coupled to the engine and/or the propeller, in the manner described herein above with reference to FIG. 2 and FIG. 3.

The next step 506 comprises a determination as to whether the one or more signals obtained at steps 502 and 504 are healthy, in the manner described herein with reference to FIG. 2 and FIG. 3. If it is determined at step 506 that the one or more signals are not healthy, the method 500 ends at step 508. Otherwise, the method 500 proceeds with performing a propeller jammed detection logic at step 510, based on the failure-free signal(s). When it is determined that the propeller is functioning properly, the method may end at step 508. Otherwise, an alert indicating that the propeller is malfunctioning (i.e. operating at fixed pitch or jammed) is output at step 512 for cockpit annunciation.

Figure 6:
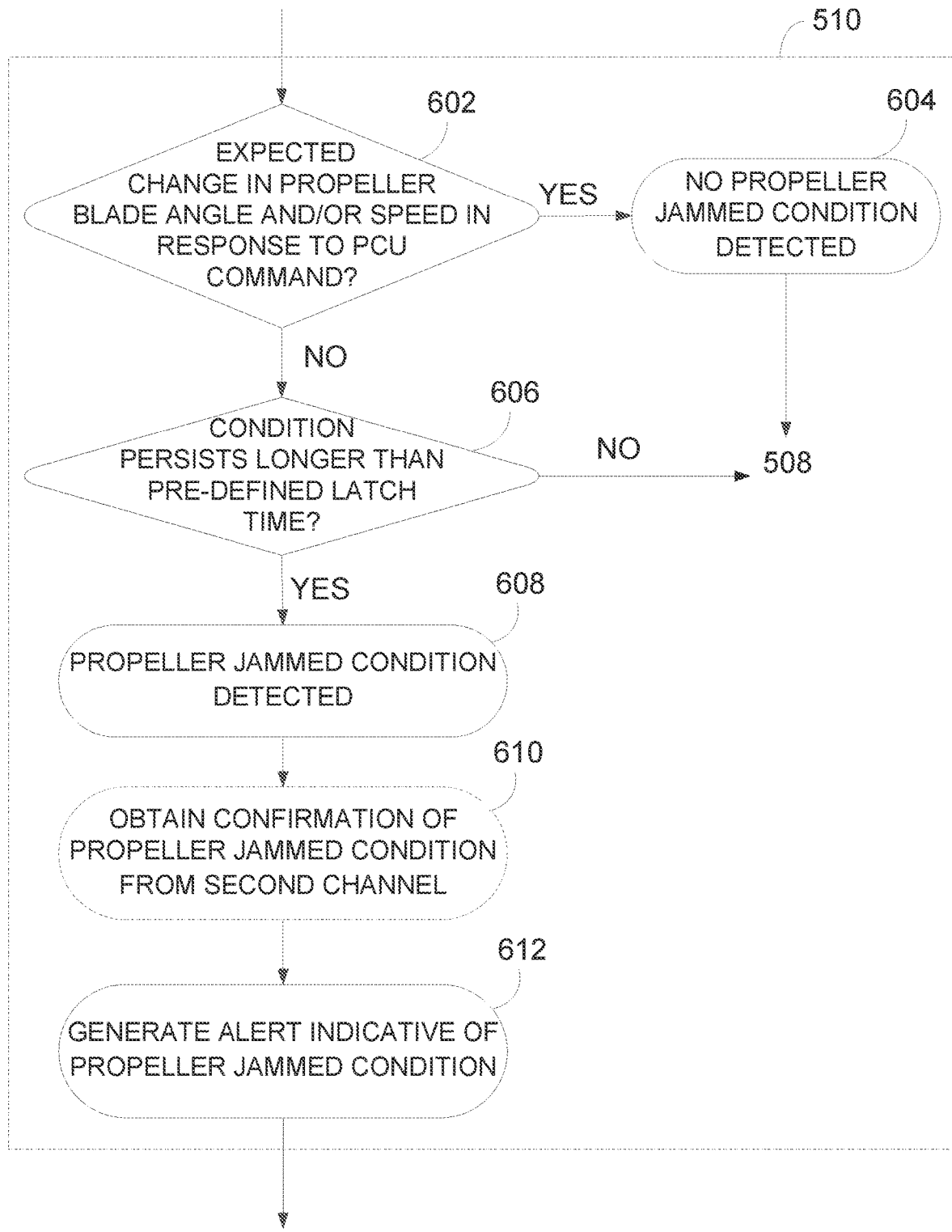
FIG. 6 is a flowchart of the step of performing propeller jammed detection logic of FIG. 4, in accordance with an illustrative embodiment.

Referring now to FIG. 6 in addition to FIG. 5, the step 510 of performing a propeller jammed detection logic comprises assessing, at step 602, whether an expected change in the blade angle and/or rotational speed of the propeller has occurred in response to the PCU command. This assessment is illustratively performed on the basis of the input signal(s) received at step 502 (i.e. on the basis of the actual value of the blade angle and/or rotational speed of a propeller), in the manner described herein with reference to FIG. 2 and FIG. 3. If it is determined at step 602 that the expected change has occurred, no malfunction of the propeller (i.e. no propeller jammed fault condition) is detected (step 604) and the method 500 may end (step 508). Otherwise, if it is determined at step 602 that the expected change in the blade angle and/or rotational speed of the propeller has not occurred in response to the PCU command, the next step 606 is to assess whether this condition has persisted for a period of time longer than (i.e. exceeding) a pre-defined latch time. If this is not the case, the method 500 ends (step 508). Otherwise, if it is determined at step 606 that the lack of change in the blade angle and/or rotational speed of the propeller has occurred for a time period exceeding the latch time, a propeller jammed condition is detected at step 608. In embodiments where a dual-channel controller is used to perform the propeller malfunction detection logic, step 608 entails detecting the propeller jammed condition on the first (i.e. active) channel. The next step 610 may then be to obtain a confirmation of the propeller jammed condition from the second (i.e. standby) channel. After the propeller jammed condition has been detected (step 608) and optionally confirmed on both channels (step 610), an alert indicative of this condition is then generated at step 612 for output to the cockpit in the manner described herein above.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for detecting fixed pitch operation of a variable pitch propeller of an engine, the method comprising:
   outputting a command signal for maintaining a rotational speed of the propeller at a reference speed;
   obtaining an actual value of at least one of the rotational speed and a blade angle of the propeller;
   assessing, from the actual value, whether an expected change in the at least one of the rotational speed and the blade angle of the propeller has occurred in response to the command signal;
   determining a period of time for which the expected change in the at least one of the rotational speed and the blade angle of the propeller has not occurred;
   comparing the period of time to a pre-determined duration; and
   responsive to determining that the period of time exceeds the pre-determined duration and determining that the expected change in the at least one of the rotational speed and the blade angle of the propeller has not occurred in response to the command signal, detecting operation of the propeller at fixed pitch and outputting an alert accordingly.

2. The method of claim 1, wherein the command signal is output comprising instructions for causing oil to be exchanged between a blade angle actuator of the propeller and a source of fluid to control the blade angle of the propeller for maintaining the rotational speed of the propeller at the reference speed.

3. The method of claim 2, wherein the command signal is output comprising instructions for causing adjustment of a governing current that controls actuation of a valve operable to selectively fluidly connect the blade angle actuator with the source of fluid.

4. The method of claim 1, wherein the actual value of at least one of the rotational speed and the blade angle of the propeller is obtained from one or more measurements acquired by one or more sensors coupled to the propeller.

5. The method of claim 1, wherein the command signal is output to increase the rotational speed of the propeller, and further wherein assessing whether the expected change in the at least one of the rotational speed and the blade angle of the propeller has occurred comprises assessing whether the blade angle of the propeller has decreased in response to the command signal.

6. The method of claim 1, wherein the command signal is output to decrease the rotational speed of the propeller, and further wherein assessing whether the expected change in the at least one of the rotational speed and the blade angle of the propeller has occurred comprises assessing whether the blade angle of the propeller has increased in response to the command signal.

7. The method of claim 3, wherein the command signal is output comprising instructions for causing the governing current to be increased, and further wherein assessing whether the expected change in the at least one of the rotational speed and the blade angle of the propeller has occurred comprises assessing whether the rotational speed of the propeller has increased in response to the command signal.

8. The method of claim 3, wherein the command signal is output comprising instructions for causing the governing current to be decreased, and further wherein assessing whether the expected change in the at least one of the rotational speed and the blade angle of the propeller has occurred comprises assessing whether the rotational speed of the propeller has decreased in response to the command signal.

9. The method of claim 1, wherein operation of the propeller at fixed pitch is detected responsive to determining that the expected change has not occurred on either of a first controller channel and a second controller channel.

10. The method of claim 1, wherein outputting the alert comprises generating a warning message indicative of operation of the propeller at fixed pitch and outputting the warning message for cockpit annunciation.

11. A system for detecting fixed pitch operation of a variable pitch propeller of an engine, the system comprising:
    a processing unit; and
    a non-transitory computer readable medium having stored thereon program code executable by the processing unit for:
       outputting a command signal for maintaining a rotational speed of the propeller at a reference speed;
       obtaining an actual value of at least one of the rotational speed and a blade angle of the propeller;
       assessing, from the actual value, whether an expected change in the at least one of the rotational speed and the blade angle of the propeller has occurred in response to the command signal;
       determining a period of time for which the expected change in the at least one of the rotational speed and the blade angle of the propeller has not occurred;
       comparing the period of time to a pre-determined duration; and
       responsive to determining that the period of time exceeds the pre-determined duration and determining that the expected change in the at least one of the rotational speed and the blade angle of the propeller has not occurred in response to the command signal, detecting operation of the propeller at fixed pitch and outputting an alert accordingly.

12. The system of claim 11, wherein the program code is executable by the processing unit for outputting the command signal comprising instructions for causing oil to be exchanged between a blade angle actuator of the propeller and a source of fluid to control the blade angle of the propeller for maintaining the rotational speed of the propeller at the reference speed.

13. The system of claim 12, wherein the program code is executable by the processing unit for outputting the command signal comprising instructions for causing adjustment of a governing current that controls actuation of a valve operable to selectively fluidly connect the blade angle actuator with the source of fluid.

14. The system of claim 11, wherein the program code is executable by the processing unit for one of:
  outputting the command signal comprising instructions to increase the rotational speed of the propeller, and assessing whether the blade angle of the propeller has decreased in response to the command signal; and
  outputting the command signal comprising instructions to decrease the rotational speed of the propeller, and assessing whether the blade angle of the propeller has increased in response to the command signal.

15. The system of claim 13, wherein the program code is executable by the processing unit for one of:
  outputting the command signal comprising instructions for causing the governing current to be increased, and assessing whether the rotational speed of the propeller has increased in response to the command signal; and
  outputting the command signal comprising instructions for causing the governing current to be decreased, and assessing whether the rotational speed of the propeller has decreased in response to the command signal.

16. The system of claim 11, wherein the program code is executable by the processing unit for outputting the command signal comprising instructions for detecting operation of the propeller at fixed pitch responsive to determining that the expected change has not occurred on either of a first controller channel and a second controller channel.

17. The system of claim 11, wherein the program code is executable by the processing unit for outputting the command signal comprising instructions for outputting the alert comprising generating a warning message indicative of operation of the propeller at fixed pitch and outputting the warning message for cockpit annunciation.

18. A non-transitory computer-readable medium having stored thereon program instructions executable by a processor for detecting fixed pitch operation of a variable pitch propeller of an engine, the program instructions configured for:
  outputting a command signal for maintaining a rotational speed of the propeller at a reference speed;
  obtaining an actual value of at least one of the rotational speed and a blade angle of the propeller;
  assessing, from the actual value, whether an expected change in the at least one of the rotational speed and the blade angle of the propeller has occurred in response to the command signal;
  determining a period of time for which the expected change in the at least one of the rotational speed and the blade angle of the propeller has not occurred;
  comparing the period of time to a pre-determined duration; and
  responsive to determining that the period of time exceeds the pre-determined duration and determining that the expected change in the at least one of the rotational speed and the blade angle of the propeller has not occurred in response to the command signal, detecting operation of the propeller at fixed pitch and outputting an alert accordingly.

* * * * *